United States Patent
Nagata et al.

(10) Patent No.: US 7,545,116 B2
(45) Date of Patent: Jun. 9, 2009

(54) DRIVER FOR INDUCTION MOTOR AND METHOD OF DRIVING THE SAME

(75) Inventors: Koichiro Nagata, Mito (JP); Toshiaki Okuyama, Tokai-mura (JP); Kouki Yamamoto, Hitachinaka (JP); Hiroyuki Tomita, Funabashi (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 11/626,941

(22) Filed: Jan. 25, 2007

(65) Prior Publication Data

US 2007/0210741 A1 Sep. 13, 2007

(30) Foreign Application Priority Data

Mar. 13, 2006 (JP) .............................. 2006-067258

(51) Int. Cl.
*H02P 27/04* (2006.01)
(52) U.S. Cl. ...................... 318/807; 318/727; 318/799; 318/801
(58) Field of Classification Search ................. 318/807, 318/801, 805, 727, 798, 779
See application file for complete search history.

(56) References Cited

U.S. PATENT DOCUMENTS

| | | | | |
|---|---|---|---|---|
| 2,774,923 A | * | 12/1956 | Wickerham | ................. 318/742 |
| 4,009,427 A | * | 2/1977 | Takahashi | ................. 318/700 |
| 4,855,661 A | * | 8/1989 | Okamoto et al. | ............. 318/807 |
| 4,965,847 A | * | 10/1990 | Jurkowski et al. | ........... 388/814 |
| 5,155,797 A | * | 10/1992 | Nomura et al. | ............. 388/815 |
| 5,479,081 A | * | 12/1995 | Seibel et al. | ................. 318/805 |
| 5,739,664 A | * | 4/1998 | Deng et al. | ................. 318/808 |
| 5,796,236 A | * | 8/1998 | Royak | ......................... 318/804 |
| 6,300,741 B1 | * | 10/2001 | Okuyama | ................... 318/799 |
| 6,720,751 B2 | * | 4/2004 | Plasz et al. | ................... 318/567 |
| 2007/0159131 A1 | * | 7/2007 | Kitanaka | ..................... 318/807 |

FOREIGN PATENT DOCUMENTS

| | | |
|---|---|---|
| EP | 0 241 045 | 10/1987 |
| JP | 61-076089 | 4/1986 |
| JP | 10-023800 | 1/1998 |

* cited by examiner

*Primary Examiner*—Bentsu Ro
*Assistant Examiner*—Antony M Paul
(74) *Attorney, Agent, or Firm*—Antonelli, Terry, Stout & Kraus, LLP.

(57) ABSTRACT

An object of the present invention is to provide a driver for an induction motor which performs an operation at an acceleration suitable for the magnitude of a load and is excellent in efficiency, without an acceleration failure. The driver for an induction motor includes a slip frequency estimate value arithmetic operation section 15 for arithmetically operating a slip frequency $\omega s^{\wedge}$ of an induction motor 12, and a maximum torque generation slip arithmetic operation section 16 for arithmetically operating a slip frequency $\omega smax$ at which a maximum torque is generated. When the slip frequency $\omega s^{\wedge}$ exceeds a predetermined value $\omega smaxTH$ (=0.9 $\omega smax$, etc.) corresponding to the slip frequency $\omega smax$ at which the maximum torque is generated, a speed change rate arithmetic operation section 17 and a speed change rate correcting section 18 reduce a rate of increase in a speed command $\omega r^*$. In addition, when the slip frequency approaches the maximum torque generation slip frequency too closely, the load concerned is judged to be overloaded, and an alarm is generated.

14 Claims, 4 Drawing Sheets

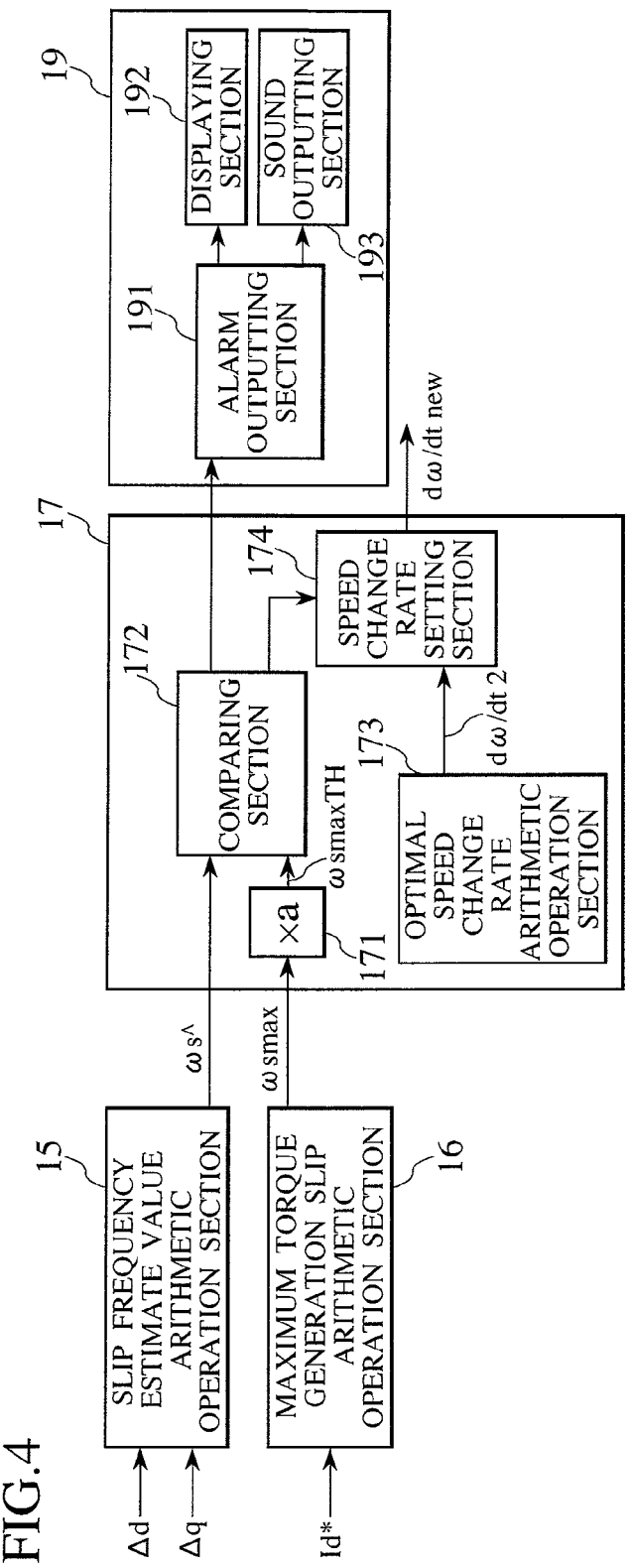
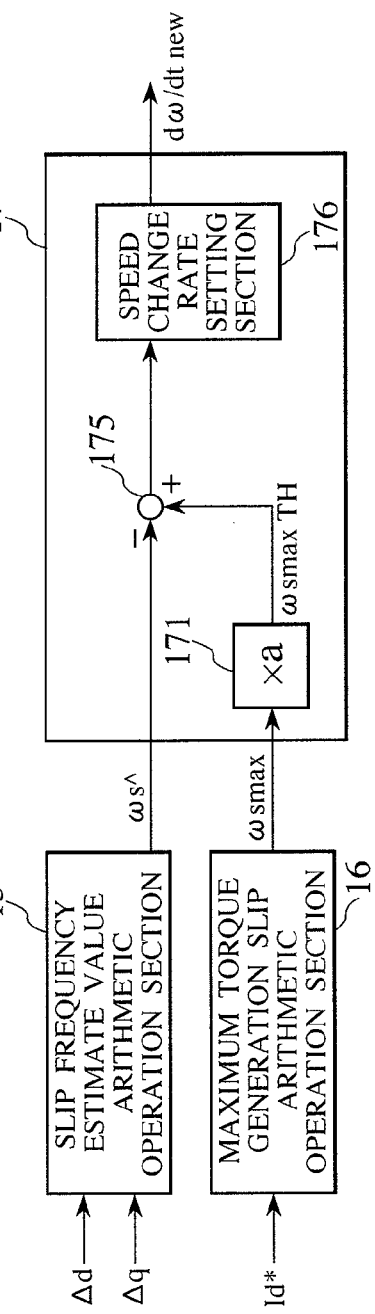

DRIVER FOR INDUCTION MOTOR AND METHOD OF DRIVING THE SAME

BACKGROUND OF THE INVENTION

1. Field of the Invention

The present invention relates to a driver for an induction motor which drives the induction motor in a variable speed manner, and a method of driving an induction motor, and more particularly to a driver for an induction motor which is suitable for the case where a crane apparatus or the like with which loads are lifted is driven, and a method of driving an induction motor.

2. Description of the Related Art

When loads are lifted at an acceleration α with a lifting and lowering apparatus such as a crane, as shown in Expression (1), a necessary torque τm depends on the acceleration α, and a weight m·g of a load. Note that, it is assumed in Expression (1) that a load is lifted with a pulley having a radius r.

$$M \cdot \alpha \cdot r = J \cdot d\omega/dt = \tau m - m \cdot g \cdot r \qquad (1)$$

where J is a total inertia moment in a system including a motor and a mechanical system (having the pulley and the like), ω is a rotational speed of the motor, m is a mass of the load, and g is a gravitational acceleration.

Here, a maximum value of the torque τm depends on a motor capacity. Thus, when a value of m·g·r in Expression (1) is large, the acceleration a in Expression (1) becomes negative or zero. As a result, it is impossible to lift the load. On the other hand, even when the acceleration a is positive, if a rate of change in speed expressed by dω*/dt is larger than the value (maximum value of torque τm−M·g·r)/J, the motor cannot follow a command, and thus the lifting fails.

Conventional vector control for an induction motor, for example, is disclosed in Japanese Patent No. 3351244. An outline of conventional speed sensorless vector control for an induction motor will now be described. When a primary frequency is given in accordance with an activation command, an exciting current command is arithmetically operated. When the induction motor is activated, a speed estimate value is arithmetically operated based on a current command, a voltage command, and the like. A torque current command is arithmetically operated so that the resulting speed estimate value coincides with the given speed command. Also, a d-axis current control system and a q-axis current control system are provided, and a d-axis voltage and a q-axis voltage are corrected so as to coincide with corresponding command values. A primary frequency command for a power converter is arithmetically operated based on the speed command, the speed estimate value, the current commands and the like. A d-axis voltage command and a q-axis voltage command are arithmetically operated by using the primary frequency command, the various kinds of current commands, and outputs from current control sections, and are converted into three-phase A.C. voltage commands by using arithmetically operated phases. Also, the power converter generates three-phase A.C. voltages in accordance with the resulting three-phase A.C. voltage commands, and the three-phase A.C. voltages thus generated are supplied to the induction motor.

In the conventional vector control, the currents and the voltages are controlled in the manner as described above so that an actual speed follows a predetermined speed command.

The lifting and lowering apparatus such as the crane operates to lift loads having a certain weight from a place, lower the loads to put them at another place, and lift other loads having a different weight in some cases. Thus, there is the possibility that the magnitude of the load largely differs every time. When the acceleration rate is always held constant, if the weight (m·g) is large, as can be seen from Expression (1), there is the case where the acceleration cannot be made. When the loads cannot be lifted, for example, there is expected a method in which after an alarm is generated to urge a worker to reduce the loads, and the worker lightens the load, the loads are lifted. In this case, however, the worker is forced to be interrupted, and thus the work efficiency is poor. When the maximum load can be supposed, there is no problem even in the case of an acceleration rate that has been initially set. However, with the conventional control method, it is impossible to cope with the case where the magnitude of the load differs every time, and thus the unsupposed load is applied to the lift.

SUMMARY OF THE INVENTION

In the light of the foregoing, it is therefore an object of the present invention to provide a driver for an induction motor which is capable of performing an operation with high efficiency for various kinds of loads without interrupting work.

According to one aspect of the present invention, driving control for an induction motor is provided, the induction motor including a power converter for operating the induction motor in a variable speed manner in accordance with a speed command. In the driving control, when a slip frequency of the induction motor is arithmetically operated and the arithmetically operated slip frequency approaches a predetermined range corresponding to the maximum torque generation slip frequency at which a maximum torque is generated, a rate of change in the speed command is reduced.

With a technique for reducing a rate of change in a speed command, desirably, a rate of increase in the speed command is reduced.

According to another aspect of the present invention, driving control for an induction motor is provided, the induction motor including a power converter for operating the induction motor in a variable speed manner in accordance with a speed command. In the driving control, when a slip frequency of the induction motor is arithmetically operated and the arithmetically operated slip frequency approaches a predetermined range corresponding to the maximum torque generation slip frequency at which a maximum torque is generated, an alarm adapted to be recognized by a sense of sight and/or a sense of hearing is generated.

According to a desirable embodiment of the present invention, a driver for an induction motor includes a slip frequency arithmetic operation section for arithmetically operating a slip frequency of the induction motor, and a maximum torque generation slip frequency arithmetic operation section for arithmetically operating a slip frequency at which a maximum torque is generated. When the arithmetically operated slip frequency value exceeds a predetermined value corresponding to the slip frequency at which the maximum torque is generated, the rate of change in the speed command is suppressed, or the speed command is corrected, and a worker is informed of this effect with an indicator and a speaker.

In addition, according to desirable another embodiment of the present invention, the rate of change in the speed command is corrected in accordance with a difference between the arithmetically operated slip frequency value and the predetermined value corresponding to the slip frequency at which the maximum torque is generated.

According to the desirable embodiments of the present invention, when the induction motor is accelerated, the induction motor can be accelerated at an optimal rate corresponding to the load. Thus, for example, when the loads are lifted with the lifting and lowering apparatus such as the crane, even in the case where the load is heavy for the predetermined acceleration rate, the predetermined acceleration rate can be changed to the optimal acceleration rate. As a result, the work can be performed with high efficiency without stopping the driver.

Other objects and features of the present invention will be made clear in the preferred embodiments which will be described below.

BRIEF DESCRIPTION OF DRAWINGS

Other objects and advantages of the invention will become apparent from the following description of embodiments with reference to the accompanying drawings in which:

FIG. 4 is a block diagram showing an example of a concrete structure of a speed change rate arithmetic operation section 17.

FIG. 5 is a block diagram showing a structure of a speed change rate arithmetic operation section of a driver for an induction motor according to Embodiment 5 of the present invention.

DESCRIPTION OF THE PREFERRED EMBODIMENTS

Embodiments of the present invention will be described hereinafter with reference to the accompanying drawings.

Embodiment 1

Figure 1:
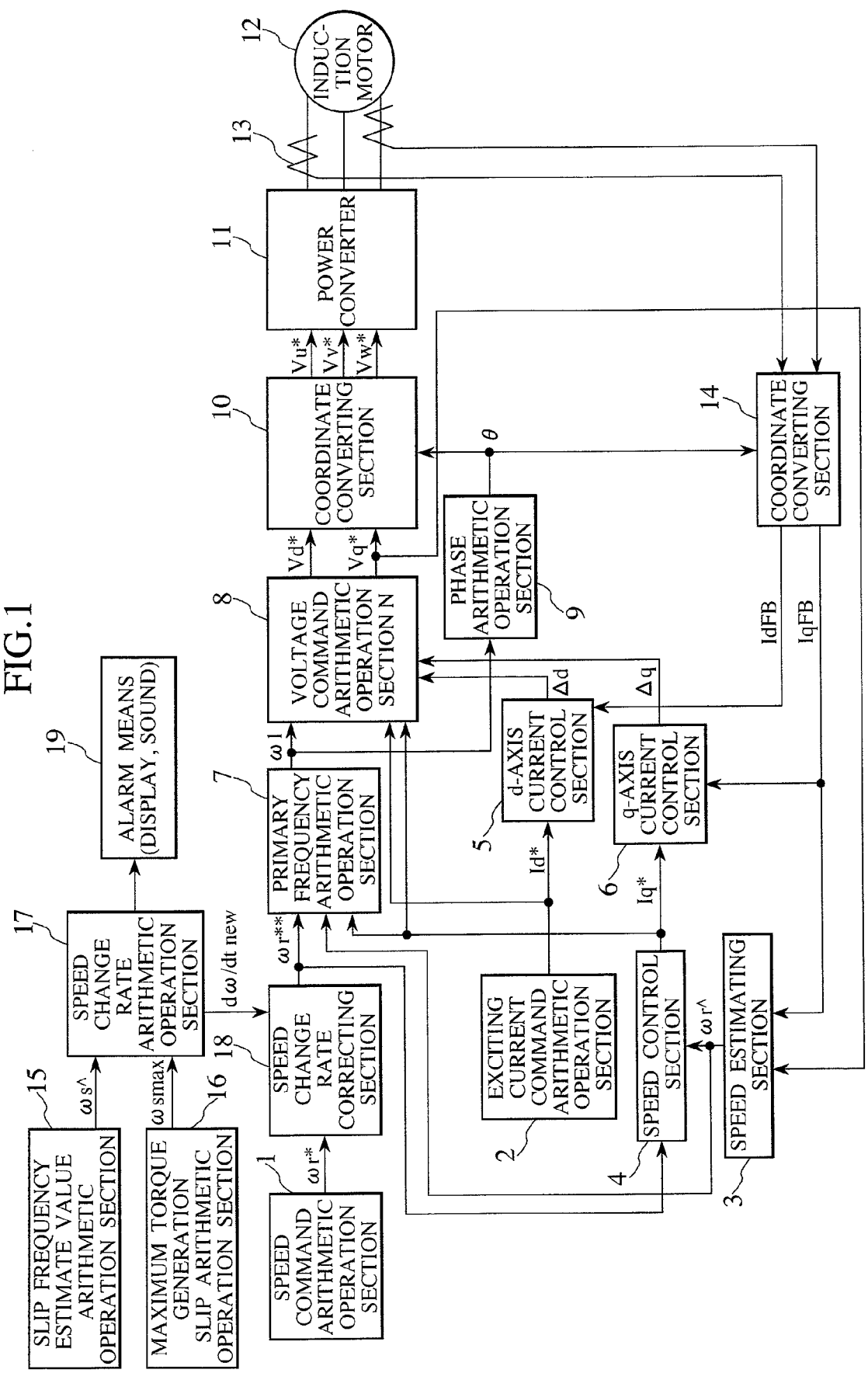
FIG. 1 is a block diagram showing overall control for a driver for an induction motor according to Embodiment 1 of the present invention.

FIG. 1 is a block diagram showing overall control for a driver for an induction motor according to Embodiment 1 of the present invention. Firstly, a driving control system for an induction motor based on vector control will now be described.

A speed command arithmetic operation section 1 outputs a speed command $\omega r^*$. When an induction motor is accelerated, the speed command $\omega r^*$ is changed with time at a predetermined rate of change. An exciting current command arithmetic operation section 2 arithmetically operates an exciting current command $Id^*$. A speed estimating section 3 arithmetically operates a speed estimate value $\omega r\hat{}$ based on a current feedback value, a voltage command and the like. Note that, various kinds of methods are known as a method of arithmetically operating the speed estimate value $\omega r\hat{}$. The present invention can also be applied to another method of estimating the value $\omega r\hat{}$ other than the estimating method described in Embodiment 1. A speed control section 4 arithmetically operates a torque current command $Iq^*$ so that the speed estimate value $\omega r\hat{}$ coincides with the speed command $\omega r^*$. A d-axis current control section 5 and a q-axis current control section 6 arithmetically operate a d-axis voltage correction value $\Delta d$ and a q-axis voltage correction value $\Delta q$, respectively, so that an Id feedback value (IdFB) and an Iq feedback value (IqFB) coincide with the exciting current command $Id^*$ and the torque current command $Iq^*$, respectively. A primary frequency arithmetic operation section 7 arithmetically operates a primary frequency $\omega 1$ in accordance with the speed command $\omega r^*$, the speed estimate value $\omega r\hat{}$, the torque current command $Iq^*$, and the like. A voltage command arithmetic operation section 8 arithmetically operates a d-axis voltage command $Vd^*$, and a q-axis voltage command $Vq^*$ by using the primary frequency $\omega 1$, the various kinds of current commands, and outputs from d-axis and q-axis current control sections 5 and 6. A coordinate converting section 10 converts the d-axis voltage command $Vd^*$ and the q-axis voltage command $Vq^*$ into three-phase A.C. voltage commands by using a phase $\theta$ which is arithmetically operated in a phase arithmetic operation section 9. Three-phase A.C. voltages are applied to an induction motor 12 through a power converter 11. In addition, a coordinate converting section 14 converts current detection values from a current detecting section 13 into the Id and Iq current feedback values IdFB and IqFB, respectively, by using the phase $\theta$.

Next, an outline of a control system for correcting a rate of change in speed which is added according to the present invention will now be described.

Firstly, a slip frequency estimate value arithmetic operation section 15 performs arithmetic operation for estimating a slip frequency $\omega s\hat{}$ of the induction motor 12. On the other hand, a maximum torque generation slip arithmetic operation section 16 arithmetically operates a slip frequency $\omega smax$ at which a maximum torque is generated. Next, since the estimated slip frequency $\omega s\hat{}$ of the induction motor 12 must not exceed the slip frequency $\omega smax$ at which the maximum torque is generated, a speed change rate arithmetic operation section 17 arithmetically operates a threshold corresponding to the slip frequency $\omega smax$. Also, when a rate of change in the speed command $\omega r^*$ is positive, a speed change rate correcting section 18 makes the correction so that the rate of change, especially, the rate of increase does not exceed the threshold value set by the speed change rate arithmetic operation section 17.

As a result, when the induction motor 12 is accelerated, the induction motor 12 can be accelerated at the optimal rate corresponding to the load. The speed change rate converting control system will be described in detail hereinafter.

Firstly, the slip frequency estimate value arithmetic operation section 15 performs the arithmetic operation for estimating the slip frequency $\omega s\hat{}$. The slip frequency $\omega s\hat{}$, for example, can be arithmetically operated as follows.

The voltage command arithmetic operation section 8 arithmetically operates the d-axis voltage command $Vd^*$, and the q-axis voltage command $Vq^*$ in accordance with Expression (2) and Expression (3), respectively:

$$Vd^* = r1^* \cdot Id^* - \omega 1^* \cdot L\sigma^* \cdot Iq^* + \Delta d \quad (2)$$

$$Vq^* = r1^* \cdot Iq^* + \omega 1^* \cdot L\sigma^* \cdot Id^* + \omega 1^* \cdot (M^*/L2^*) \cdot \Phi 2d^* + \Delta q \quad (3)$$

where with respect to symbols given to constants of the induction motor 12, $r1^*$ is a primary resistance, $L\sigma^*$ is a sum of primary and secondary leakage inductances, $M^*$ is a mutual inductance, $L2^*$ is a set value for a sum of the mutual inductance and the secondary side leakage inductance, $\Phi 2d^*$ is a secondary side d-axis magnetic flux command value, and $\Delta d$ and $\Delta q$ are the outputs from the d-axis current control section 5 and the q-axis current control section 6, respectively. On the other hand, relationships of Expressions (4) and (5) are established in the inside of the induction motor 12.

$$Vd = r1 \cdot Id - \omega 1 \cdot L\sigma \cdot Iq - \omega 1 \cdot (M/L2) \cdot \Phi 2q \quad (4)$$

$$Vq = r1 \cdot Iq + \omega 1 \cdot L\sigma \cdot Id + \omega 1 \cdot (M/L2) \cdot \Phi 2d \quad (5)$$

where symbols each having no asterisk (*) added thereto are measured values on the induction motor 12 side, and $\Phi 2q$ is a secondary q-axis magnetic flux.

The current controlling system performs the control so that the relationships of Id=Id* and Iq=Iq* are established. The second terms of the right-hand members of Expressions (3) and (5) can be disregarded in the lower speed region since they are sufficiently smaller than the third terms of the right-hand members of Expressions (3) and (5), respectively. In addition, since the measured values r1, $\omega$1, M and L2 are assumed to follow the set values, respectively, and the relationships of Vd*=Vd and Vq*=Vq are generally established, $\Phi 2d\hat{}$ and $\Phi 2q\hat{}$ are obtained by Expressions (6) and (7), respectively:

$$\Phi 2d\hat{} = (\Delta q + \omega 1^* \cdot (M^*/L2^*) \cdot \Phi 2d^*)/(\omega 1^* \cdot (M^*/L2^*)) \quad (6)$$

$$\Phi 2q\hat{} = -\Delta d/(\omega 1^* \cdot (M^*/L2^*)) \quad (7)$$

The slip frequency $\omega s\hat{}$ is obtained as follows by using Expressions (6) and (7). In general, $\Phi 2q$ and $\Phi 2d$ fulfill Expressions (8) and (9), respectively:

$$\Phi 2d = (M \cdot Id + \omega s \cdot T2 \cdot \Phi 2q)/(1 + T2 \cdot s) \quad (8)$$

$$\Phi 2q = (M \cdot Iq - \omega s \cdot T2 \cdot \Phi 2d)/(1 + T2 \cdot s) \quad (9)$$

where T2 is a secondary time constant of the induction motor 12, and s is a differential operator.

Here, when in order to generate the large torque in the phase of the lower speed, control is made so that the exciting current Id is caused to flow in the induction motor 12 by about the rated current (about double or more the rated exciting current), and Iq=0 is obtained, a stationary solution of $\omega s$ is obtained from Expression (9) to obtain Expression (10):

$$\omega s = -1/T2 \cdot \Phi 2q/\Phi 2d \quad (10)$$

Therefore, the slip frequency $\omega s$ is arithmetically operated in the form of the slip frequency $\omega s\hat{}$ in accordance with Expressions (6), (7) and (10).

Next, the maximum torque generation slip arithmetic operation section 16 arithmetically operates the slip frequency $\omega s$max at which the maximum torque is generated. The torque $\tau m$ is generally given by Expression (11):

$$\tau m = 3 \cdot (P/2) \cdot (M/L2) \cdot (\Phi 2d \cdot Iq - \Phi 2q \cdot Id) \quad (11)$$

where P is the number of poles of the induction motors 12.

Here, similarly to the above case, when the control is made so that the exciting current Id is made larger than normal one, and Iq=0 is obtained, the torque $\tau m$ is given by Expression (12):

$$\tau m = 3 \cdot (P/2) \cdot (M/L2) \cdot (-\Phi 2q \cdot Id) \quad (12)$$

Since the exciting current Id is a constant value, as apparent from Expression (12), the maximum torque is generated when $\Phi 2q$ is the maximum in negative value. Moreover, when stationary solutions of $\Phi 2d$ and $\Phi 2q$ are derived from Expressions (8) and (9), respectively, Expressions (13) and (14) are obtained:

$$\Phi 2d = M \cdot Id/(1 + (\omega s \cdot T2)^2) \quad (13)$$

$$\Phi 2q = -\omega s \cdot T2 \cdot M \cdot Id/(1 + (\omega s \cdot T2)^2) \quad (14)$$

where a symbol "^" represents exponentiation.

Here, it is assumed that since the rated exciting current or more is caused to flow as the exciting current Id in the induction motor 12, the magnetic flux increases to the magnetic flux saturation region, and thus the magnetic flux is expressed by $\gamma \cdot \Phi 0$ where $\Phi 0$ represents a rated magnetic flux, and $\gamma$ normally falls in the range of about 1.1 to about 1.3. At this time, $\Phi 2d$ and $\Phi 2q$ fulfill Expression (15), and show the relationship as shown in Expression (16):

$$\sqrt{(\Phi 2d^2 + \Phi 2q^2)} = \gamma \cdot \Phi 0 \quad (15)$$

$$M \cdot Id/(1 + (\omega s \cdot Ts)^2) = \gamma \cdot \Phi 0 \quad (16)$$

$\Phi 2q$ is expressed by Expression (17) from Expressions (16) and (14):

$$\Phi 2q = -\omega s \cdot T2 \cdot \gamma \cdot \Phi 0/(1 + (\omega s \cdot T2)^2) \quad (17)$$

When the primary frequency $\omega 1$ is increased and the rated current or more is supplied as the exciting current Id in the phase of lifting the loads with the crane, $\Phi 2q$ follows Expression (17) and monotonously increases with respect to the slip frequency $\omega s$. The primary frequency is equal to the slip frequency $\omega s$ until the induction motor 12 is rotated from its stationary state. However, when the primary frequency $\omega 1$ continues to increase, the magnetic saturation is dissolved and $\Phi 2q$ follows Expression (14).

Figure 2:
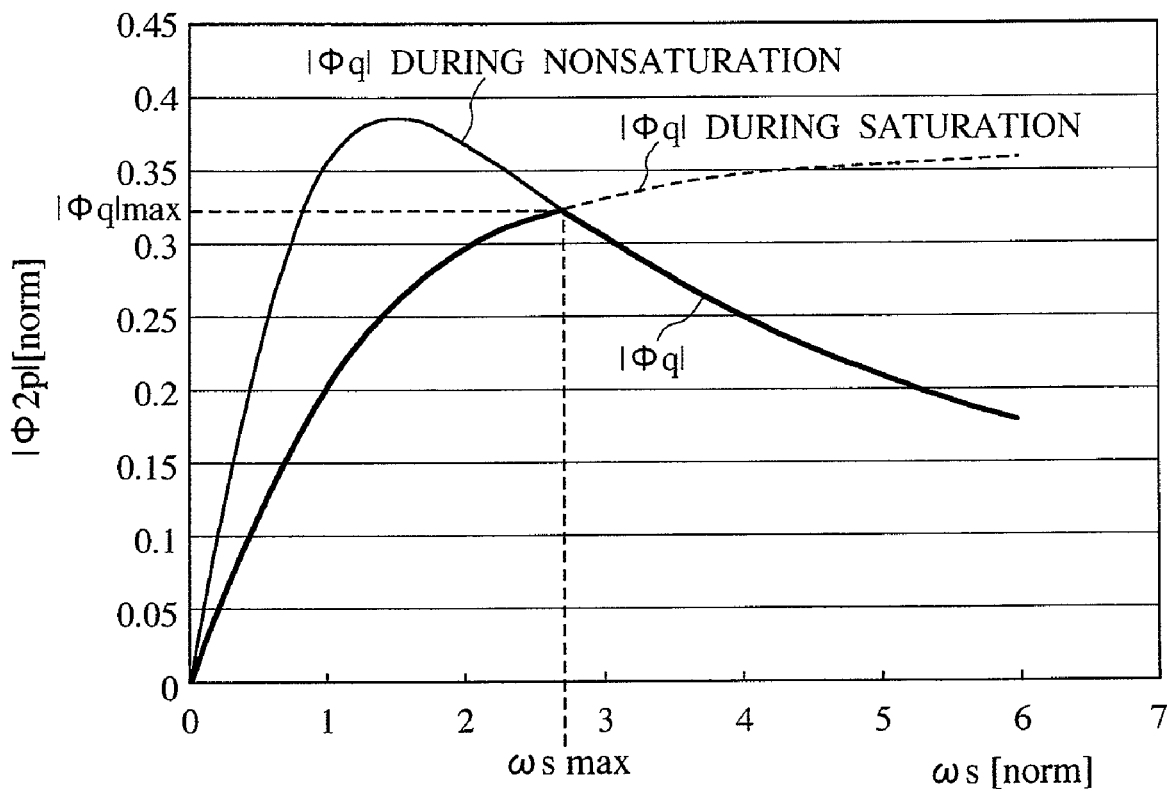
FIG. 2 is a characteristic diagram showing a relationship between a speed and a q-axis magnetic flux in the induction motor according to Embodiment 1 of the present invention.

FIG. 2 is a characteristic diagram showing a relationship between the speed and the q-axis magnetic flux of the induction motor in the driver for the induction motor according to Embodiment 1 of the present invention, and also showing the speed $\omega s$ (normalized with a predetermined value) vs. the absolute value (normalized with a predetermined value) of the magnetic flux $\Phi 2q$. Embodiment 1 of the present invention adopts the control in which the exciting current Id is controlled at a substantially constant value equal to or larger than the rated exciting current value, and the q-axis current Iq is fixed substantially to zero. When the induction motor 12 is accelerated to a predetermined speed, the exciting current is reduced to a value corresponding to the rated exciting current with an increase in the speed. The reduction in the exciting current Id dissolves the magnetic saturation at a point where curves of Expressions (14) and (17) cross each other, and thus $\Phi 2q$, that is, the torque becomes the maximum. From Expression (17), the slip frequency $\omega s$max at which the torque becomes the maximum is expressed by Expression (18), and the maximum torque $\tau m$max at that time is given by Expression (19). In Expression (18), the exciting current Id may be obtained by using the Id feedback value IdFB and the exciting current command Id*, and a value in the range of about 1.1 to about 1.3, for example, may be substituted into $\gamma$.

$$\omega s\max = \sqrt{((M \cdot Id)/\gamma/\Phi 0)^2 - 1)/T2} \quad (18)$$

$$\tau m\max = 3 \cdot (P/2) \cdot (M/L2) \cdot \gamma \cdot \Phi 0 \cdot \sqrt{(Id^2 - (\gamma \cdot \Phi 0/M)^2)} \quad (19)$$

In addition, when the exciting current Id is controlled to the constant value equal to or larger than the rated exciting current, and the q-axis current Iq is constantly controlled to zero, the current value is held substantially to a constant value irrespective of the magnitude of the load until a predetermined speed $\omega r1$ which will be described below.

Figure 3:
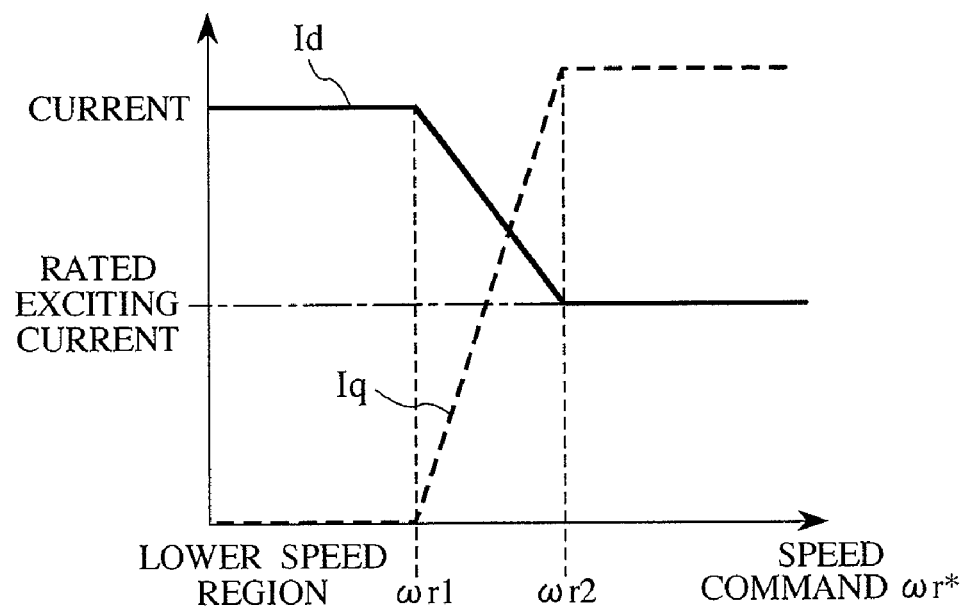
FIG. 3 is a characteristic diagram showing control for a current against a speed command in Embodiment 1 of the present invention.

FIG. 3 is a characteristic diagram showing the control for the current against the speed command. As shown in the figure, in a lower speed region in which the speed command $\omega r^*$ ranges from the zero speed to the predetermined speed $\omega r1$, the exciting current Id is held at a predetermined large given value, and the q-axis current Iq which is called the torque current in the conventional senserless vector control is held substantially at zero. In this lower speed region, the magnetic flux of the induction motor is in the magnetic saturation state due to the flowing of the large exciting current Id. Therefore, the induction motor is activated and accelerated in its speed by the motor torque based on |Φq| in the phase of magnetic saturation shown in FIG. 2. When the speed command ωr* reaches the predetermined value ωr1, the exciting current Id is reduced with an increase in the speed command ωr*. When the exciting current command arithmetic operation section 2 is structured so that the exciting current Id decreases to a value corresponding to the rated exciting current at a predetermined speed ωr2, the q-axis current Iq causes the current corresponding to the load to flow in the induction motor 12 and generates the acceleration torque so that the speed estimate value ωr^ is made to follow the speed command ωr* by the speed control section 4.

FIG. 4 is a block diagram showing an example of a concrete structure of the speed change rate arithmetic operation section 17 in Embodiment 1 of the present invention. As shown in the figure, a threshold arithmetic operation section 171 arithmetically operates a threshold ωsmaxTH corresponding to the slip frequency ωsmax. For example, the slip frequency ωsmax is increased by a times (a is 1 or less). A comparing section 172 compares the slip frequency ωs^ and the threshold ωsmaxTH with each other. When the slip frequency ωs^ is equal to or less than the threshold ωsmaxTH, a speed change rate setting section 174 sets a rate of change in a speed which is initialized. On the other hand, when a relationship of ωs^>ωsmaxTH is established, the speed change rate setting section 174 sets a rate of change in a speed dω/dt2 which is arithmetically operated in an optimal speed change rate arithmetic operation section 173. The optimal speed change rate arithmetic operation section 173, for example, performs the arithmetic operation for estimating τm^ based on Expressions (12) and (7), and outputs the value dω/dt which is arithmetically operated by using Expression (1) as a new rate of change in a speed dω/dtnew.

Next, when a rate of change in the speed command ωr* is positive, a speed change rate correcting section 18 corrects the rate of change in the speed command ωr* so that the rate of change does not exceed the output value from the speed change rate arithmetic operation section 17. On the other hand, when the rate of change in the speed command ωr* is negative, the speed change rate correcting section 18 corrects the rate of change in the speed command ωr* so that an absolute value of the rate of change does not exceed an absolute value of the output value from the speed change rate arithmetic operation section 17. When the slip frequency ωs^ equal to or less than the threshold ωsmaxTH, the rate of change in the speed which is initialized is set. Thus, the speed change rate correcting section 18 does not correct the rate of change in the speed command ωr* by using the correction value obtained from the speed change rate arithmetic operation section 17. On the other hand, when a relationship of ωs>ωsmaxTH is established, the speed change rate arithmetic operation section 17 outputs a new rate of change in the speed obtained from the optimal speed change rate arithmetic operation section 173, the speed command ωr* is corrected so as to correspond to the new rate of change in the speed in the speed change rate correcting section 18.

On the other hand, when the slip frequency ωs^ exceed the threshold ωsmaxTH, the comparing section 172 judges that the load concerned is overloaded, and outputs an overload signal to an alarm outputting section 191 of alarm means 19. Then, a displaying section 192 visually displays data on the overload signal, and a sound outputting section 193 generates an alarm in the form of a sound.

As described above, in Embodiment 1, when the slip frequency ωs^ exceeds the threshold ωsmaxTH corresponding to the slip frequency ωsmax at which the maximum torque is generated, the rate of change in the speed command ωr* is changed to the reset value. For this reason, when the rate of change in the speed command ωr* is too large as compared with the load, the induction motor 12 can be stably accelerated by reducing that rate of change.

In addition, the sound outputting section 193 generates the alarm at a time point when the slip frequency ωs^ approaches the maximum torque generation slip frequency ωsmax too closely, thereby informing the worker of the crane or the like of this effect.

Embodiment 2

A description will now be made of a difference between a driver for an induction motor according to Embodiment 2 of the present invention and the driver of Embodiment 1. For example, there is considered the case where contrary to Embodiment 1, the exciting current Id is held substantially at zero, that is, at Id=0 in the lower speed range, and the q-axis current Iq corresponding to the rated current larger than the normal rated torque current is caused to flow in the induction motor 12. The slip frequency estimate value ωs^ is expressed in the form of a stationary solution obtained by setting Id=0 in Expression (8) by Expression (20). For example, Φ2d^ and Φ2q^ expressed by Expressions (6) and (7) may be used as Φ2d and Φ2q, respectively.

$$\omega s\hat{} = 1/Ts \cdot \Phi 2d/\Phi 2q \quad (20)$$

Suffixes d and q are replaced with each other and a polarity sign is inversed in Expression (10) in Embodiment 1, thereby obtaining the slip frequency ωs^ of Expression (20). Therefore, expressions of the generated maximum torque τmmax and the flip frequency ωsmax at that time are equivalently equal to those which are obtained by replacing the suffixes d and q with each other in Expressions (18) and (19). For this reason, similarly to Embodiment 1, the threshold arithmetic operation section 171 shown in FIG. 4 arithmetically operates the threshold ωsmaxTH corresponding to the slip frequency ωsmax by, for example, multiplying the slip frequency ωsmax by a times (a is 1 or less). Also, when the slip frequency estimate value ωs^ exceeds the threshold ωsmaxTH, the rate of change in the speed command ωr* is changed, which results in the same effects as those of Embodiment 1.

Embodiment 3

A description will now be made of a difference between a driver for an induction motor according to Embodiment 3 of the present invention and the driver of Embodiment 1. In Embodiment 3, zero is given as dω/dt2 in the optimal speed change rate arithmetic operation section 173 shown in FIG. 4. As a result, when the rate of change in the speed command ωr* is too large as compared with the load and the slip frequency ωs^ exceeds the threshold ωsmaxTH in the speed change rate setting section 174, the speed change rate setting section 174 outputs zero as dω/dtnew, and the slip frequency command ωr* is fixed in the speed change rate correcting section 18. After that, when the slip frequency ωs^ decreases to a level equal to or lower than the threshold ωsmaxTH, the speed change rate correcting section 18 does not correct the rate of change in the slip frequency command ωr* since the speed change rate setting section 174 outputs the initialized rate of change in the speed. In Embodiment 3, speed command change prevention means is formed for making the rate of change in the speed of the speed command substantially zero. As a result, the setting in the optimal speed change rate arithmetic operation section 173 is simplified as compared with that of each of Embodiments 1 and 2, and thus the rate of change in the speed becomes an optimal value in average.

Embodiment 4

A description will now be made of a difference between a driver for an induction motor according to Embodiment 4 of the present invention and the driver of Embodiment 1. In Embodiment 4, the optimal speed change rate arithmetic operation section 173 shown in FIG. 4 outputs the product of a maximum torque estimate value and a predetermined value/J as the value $d\omega/dt2$. The maximum torque estimate value, for example, can be arithmetically operated by using Expression (19). It is thought that normally, an acceleration torque, which is a difference between a maximum torque and a load torque, is about 0.1 to about 0.7 times as large as the maximum torque. From this, the above-mentioned predetermined value may be set as falling within the range of about 0.1 to about 0.7. Embodiment 4 has the merit that similarly to Embodiment 3, the setting in the optimal speed change rate arithmetic operation section 173 is simplified as compared with that of each of Embodiments 1 and 2, and it is possible to obtain the higher acceleration than that in Embodiment 3.

Embodiment 5

FIG. 5 is a block diagram showing a structure of a speed change rate arithmetic operation section in a driver for an induction motor according to Embodiment 5 of the present invention. A description will now be made of a difference between a driver for an induction motor according to Embodiment 5 of the present invention and the driver of Embodiment 1.

Firstly, the threshold arithmetic operation section 171 arithmetically operates a threshold $\omega smaxTH$ corresponding to the slip frequency $\omega smax$. For example, similarly to Embodiment 1, the slip frequency $\omega smax$ is multiplied by a times (a is 1 or less). A subtracting section 175 takes out a deviation between the slip frequency $\omega s\hat{}$ and the threshold $\omega smaxTH$ corresponding to the slip frequency $\omega smax$, and a speed change rate setting section 176 arithmetically operates a rate of change in speed $d\omega/dtnew$. For example, the speed change rate setting section 176 is constituted by a proportional integrator. As a result, the rate of change in the speed command $\omega r^*$ is corrected so that the slip frequency $\omega s\hat{}$ approaches the slip frequency $\omega smax$ at which the maximum torque is generated.

According to Embodiment 5, when the rate of change in the speed is too large with respect to the load, the rate of change is reduced. On the other hand, when the rate of change in the speed is too small with respect to the load, the rate of change is increased. This makes it possible to set the optimal rate of change in the speed.

Embodiment 6

Figure 6:
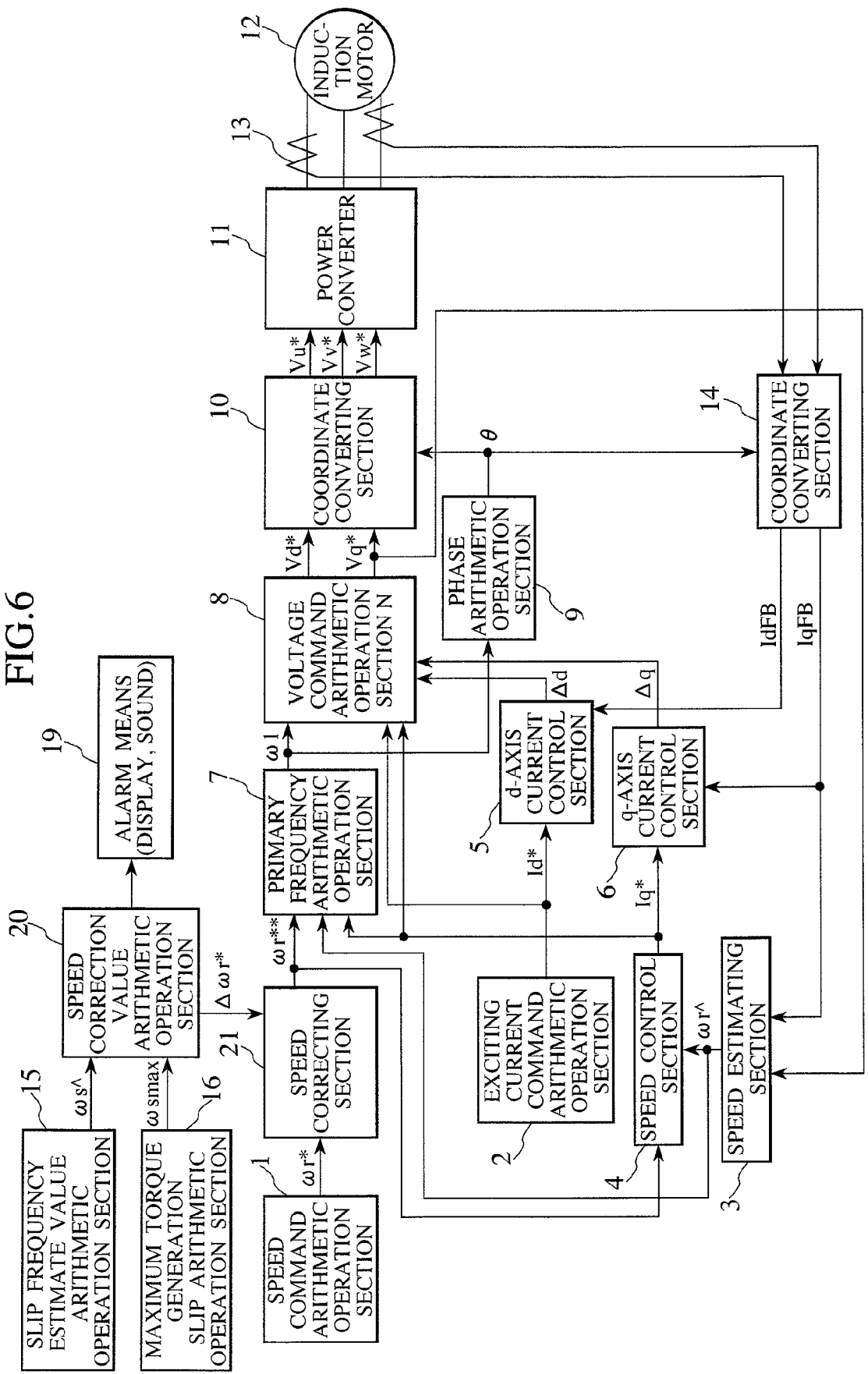
FIG. 6 is a block diagram showing overall control for a driver for an induction motor according to Embodiment 6 of the present invention.

FIG. 6 is a block diagram showing overall control for a driver for an induction motor according to Embodiment 6 of the present invention. A description will now be made of a difference between a driver for an induction motor according to Embodiment 6 of the present invention and the driver of Embodiment 1.

A speed correction value arithmetic operation section 20 outputs a speed correction value $\Delta\omega r^*$ corresponding to a difference between the slip frequency $\omega s\hat{}$ and the threshold $\omega smaxTH$ corresponding to the slip frequency $\omega smax$. A speed correcting section 21 corrects the speed command $\omega r^*$ with the speed correction value $\Delta\omega r^*$. For example, when the slip frequency $\omega s\hat{}$ exceeds the threshold $\omega smaxTH$, the speed correction value $\Delta\omega r^*$ is used to reduce the speed command $\omega r^*$ by a predetermined value, or the speed command $\omega r^*$ is corrected with a value which is obtained by multiplying a value corresponding to the difference between the slip frequency $\omega s\hat{}$ and the threshold $\omega smaxTH$ by a proportional gain or by a proportional integral gain.

In Embodiment 5, speed command reducing means for reducing the speed command is formed, and it is possible to obtain the effects same as those of each of Embodiments 1 and 4.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A driver for an induction motor including a power converter for operating the induction motor in a variable speed manner in accordance with a speed command, the driver for an induction motor comprising:
   a slip frequency arithmetic operation section for arithmetically operating a slip frequency of the induction motor;
   change rate reducing means for reducing a rate of change in the speed command when the arithmetically operated slip frequency approaches a predetermined range corresponding to a maximum torque generation frequency at which a maximum torque is generated; and
   means for setting an exciting current command ld* as a larger level, in a selected region in which the speed command or a speed corresponding value is equal to or smaller than a predetermined value, than that in any region other than the selected region.

2. The driver for an induction motor according to claim 1, further comprising a maximum torque generation slip frequency arithmetic operation section for arithmetically operating the maximum torque generation slip frequency at which the induction motor is caused to generate substantially a maximum torque.

3. The driver for an induction motor according to claim 1, wherein the change rate reducing means that reduces a rate of change in the speed command comprises reduction means for reducing a rate of increase in the speed command.

4. The driver for an induction motor according to claim 1, wherein the change rate reducing means for reducing a rate of change in the speed command comprises speed command change rate prevention means for making a rate of change in the speed command substantially zero.

5. The driver for an induction motor according to claim 1, wherein the change rate reducing means for reducing a rate of change in the speed command comprises speed command reducing means for reducing the speed command.

6. The driver for an induction motor according to claim 1, wherein the change rate reducing means for reducing a rate of change in the speed command comprises means for setting a rate of change in the speed command in accordance with a maximum torque estimate value.

7. The driver for an induction motor according to claim 1, further comprising means for correcting a rate of change in the speed command in accordance with a degree that the arithmetically operated slip frequency value approaches the maximum torque generation slip frequency.

8. The driver for an induction motor according to claim 1, further comprising means for setting a q-axis current command Iq* as a larger level, in a selected region in which one of the speed command or a speed estimate value is equal to or smaller than a predetermined value, than that in any region other than the selected region.

9. The driver for an induction motor according to claim 1, further comprising current control means for controlling a current of the induction motor at a substantially constant level, irrespective of magnitude of a load, in a region in which one of the speed command and the speed estimate value is equal to or smaller than a predetermined value.

10. A driver for an induction motor including a power converter for operating the induction motor in a variable speed manner in accordance with a speed command, the driver for an induction motor comprising:

a slip frequency arithmetic operation section for arithmetically operating a slip frequency of the induction motor;

alarm means for generating an alarm adapted to be recognized by a sense of sight and/or a sense of hearing when the arithmetically operated slip frequency approaches a predetermined range corresponding to a maximum torque generation slip frequency at which a maximum torque is generated; and means for setting an exciting current command ld* as a larger level, in a selected region in which the speed command or a speed corresponding value is equal to or smaller than a predetermined value, than that in any region other than the selected region.

11. A method of driving an induction motor including a power converter for operating the induction motor in a variable speed manner in accordance with a speed command, the method comprising:

the slip frequency arithmetic operation step of arithmetically operating a slip frequency of the induction motor;

the change rate reducing step of reducing a rate of change in the speed command when the arithmetically operated slip frequency approaches a predetermined range corresponding to a maximum torque generation slip frequency at which a maximum torque is generated; and the step of setting an exciting current command Id* as a larger level, in a selected region in which the speed command or a speed corresponding value is equal to smaller than a predetermined value, than that in any region other than the selected region.

12. The method of driving an induction motor according to claim 11, wherein the change rate reducing step of reducing a rate of change in the speed command comprises the reduction step of reducing a rate of increase in the speed command.

13. The method of driving an induction motor according to claim 11, wherein the change rate reducing step of reducing a rate of change in the speed command comprises the step of setting the rate of change in the speed command in accordance with a maximum torque estimate value.

14. The method of driving an induction motor according to claim 11, further comprising the step of correcting the rate of change in the speed command in accordance with a degree that the arithmetically operated slip frequency approaches the maximum torque generation slip frequency.

* * * * *